UNITED STATES PATENT OFFICE.

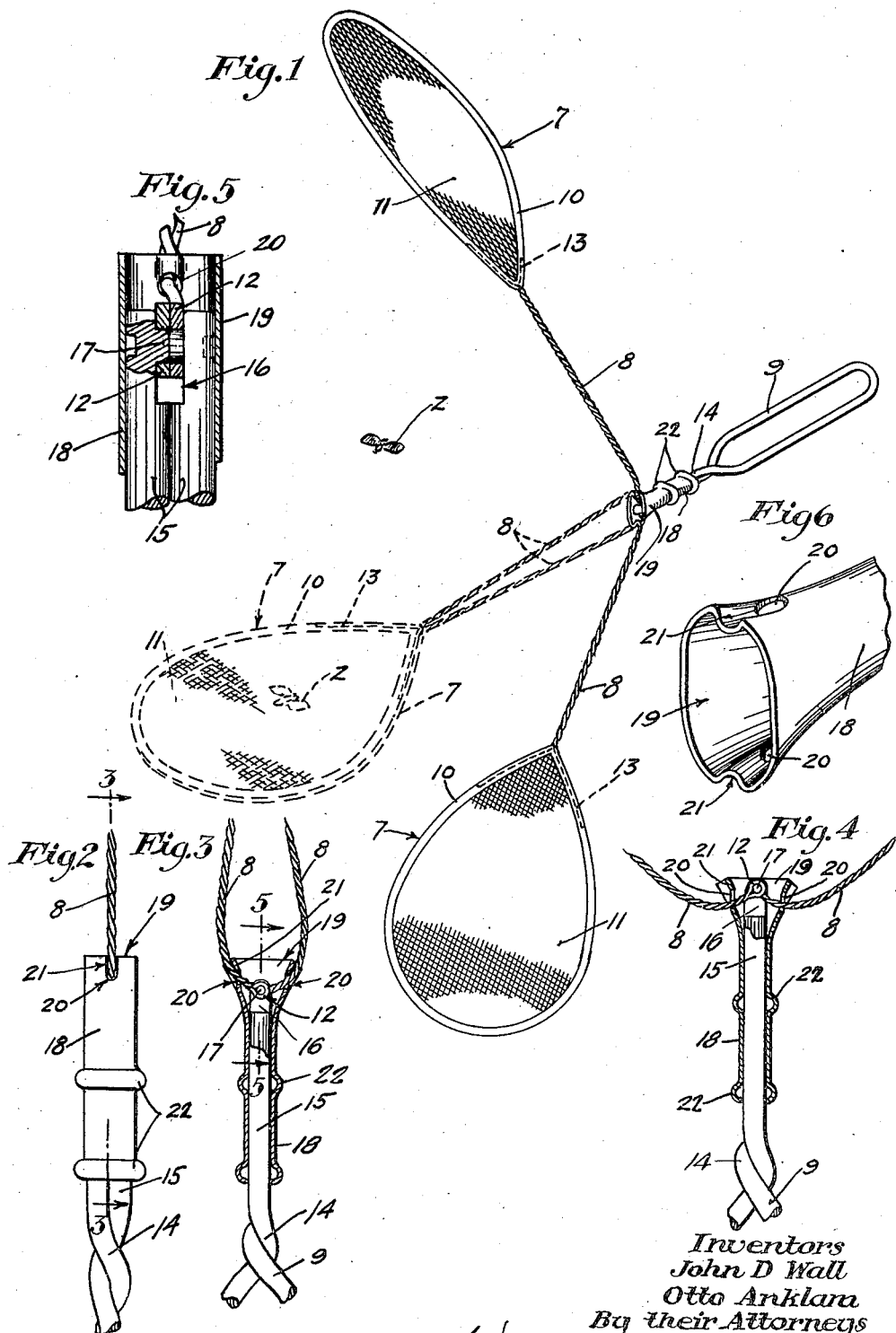

JOHN D. WALL AND OTTO ANKLAM, OF MINNEAPOLIS, MINNESOTA.

FLY CATCHER AND SWATTER.

1,323,509.  Specification of Letters Patent.  Patented Dec. 2, 1919.

Application filed February 15, 1919. Serial No. 277,190.

*To all whom it may concern:*

Be it known that we, JOHN D. WALL and OTTO ANKLAM, citizens of the United States, residing at Minneapolis, in the county of Hennepin and State of Minnesota, have invented certain new and useful Improvements in Fly Catchers and Swatters; and we do hereby declare the following to be a full, clear, and exact description of the invention, such as will enable others skilled in the art to which it appertains to make and use the same.

Our invention has for its object to provide a simple and highly efficient fly catcher and swatter; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a perspective view of the invention with some parts shown in different positions by means of broken lines;

Fig. 2 is a fragmentary detail view in elevation showing the operating sleeve and adjoining parts of the device, on an enlarged scale;

Fig. 3 is a view partly in elevation and partly in section taken on the line 3—3 of Fig. 2;

Fig. 4 is a view corresponding to Fig. 3, with the exception that the operating sleeve has been moved into a position to close the device;

Fig. 5 is a detail view with some parts sectioned on the line 5—5 of Fig. 3, on an enlarged scale; and Fig. 6 is a fragmentary perspective view of the head end of the operating sleeve, on an enlarged scale.

The numeral 7 indicates a coöperating pair of wings or flaps having stems 8 pivotally connected to a handle 9 for opening and closing movement. Each wing 7 comprises a marginal frame 10 and a reticular web 11. The frames 10 are preferably formed from relatively light sheet metal folded to form an endless channel within which the marginal edges of the webs 11 are inserted and secured thereto by pressing the walls of said channels inward thereon. As shown, the webs 11 are preferably made from a close wire mesh.

Each stem 8 is preferably made, as shown, from a single piece of wire folded upon itself and the members thereof twisted together to connect the same and give the stems the required rigidity. In twisting the wires to form the stems 8, their looped ends are flattened to afford eyes 12, and their free end portions are bent to afford a pair of diverging prongs 13. These prongs 13 are placed within the channels of the frames 10, at the time the webs 11 are secured thereto, and secured to said frames in the same manner that the webs 11 are secured thereto.

The handle 9 is also made from a single piece of wire, of sufficient thickness to give the handle its required strength. In bending the wire to form the handle, the same is first folded upon itself and the members thereof laterally spaced to give the handle proper a width that will make it easy to hold. At the inner end of the handle proper, the members of the wire are twisted together at 14 to connect the same and then pressed together in parallel arrangement to afford a shank 15.

The outer end of the shank 15 is bifurcated at 16 by flattening the inner or adjacent faces of the members thereof. To form pivots for the stems 8 to connect the same to the handle 9, the members of the shank 15, at substantially longitudinal centers of the notches 16, are pressed inward from their outer faces to form a pair of alined trunnions 17, which extend through the eyes 12 in said stems. The inner ends of the trunnions 17 meet and thereby extend completely across the notch and securely hold the eye ends of the stems 8 against displacement. In securing the stems 8 to the handle 9, the members of the shank 15 are sprung slightly apart to permit the eye ends of said stems to be inserted between said trunnions, one at a time and into position thereon.

To operate the stems 8, and thereby open and close the wings 7, there is slidably mounted on the shank 15 an operating sleeve 18, one end of which is expanded to provide a flaring head 19 having formed therein a pair of diametrically opposite cam-acting bores or openings 20, within which the stems 8 work. The head 19, outward of the openings 20, is pressed inward to form short channels 21 within which the stems 8 lie, when the wings 7 are closed. Obviously, by sliding the sleeve endwise on the shank 15, the openings 20, operating on the stems 8 with a cam action, open and close the wings 7. The sleeve 18 closely engages the shank 15, and thereby holds the members thereof against separation, so that the stems 8 cannot be separated from the trunnions 17. To afford hand-holds on the sleeve 18, a pair of ribs 22 are pressed therefrom.

The device may be used by closing the wings 7 onto a fly Z, as indicated by full lines in Fig. 1, and catching the fly therebetween and kill the same, as shown by broken lines in the same figure, or said wings may be folded onto each other, as shown by said broken lines, and the device used as a swatter. The movable parts of the device all work freely, so that the same may be operated very quickly to catch a fly therebetween. When the device is used as a fly swatter, the operator may, with the same hand in which the device is held, hold the operating sleeve retracted, which, in turn, through the sleeves 8, holds the wings 7 closed, the one upon the other.

What we claim is:—

1. In a device of the kind described, the combination with a handle, of a pair of cooperating wings having stems pivoted to the handle, and an operating sleeve mounted on the handle and provided with a flaring head engageable with said stems with a cam action for opening and closing the wings.

2. In a device of the kind described, the combination with a handle, of a pair of cooperating wings connected to the handle for opening and closing movement, each of said wings comprising a marginal frame and a reticular web connected thereto, and means for opening and closing said wings.

3. In a device of the kind described, the combination with a handle, of a pair of cooperating wings having stems, each of said stems comprising a single wire bent upon itself and twisted together, the looped ends of said stems affording eyes and the free ends thereof being secured to said wings, a pivot extending through the eyes of said stems and connecting the same to the handle, and means for operating the stems to open and close the wings.

4. In a device of the kind described, the combination with a handle formed from a single piece of wire bent upon itself to afford an open handle and a shank therefor, the members of said shank at their outer end portions being flattened at their inner faces to afford a notch and their outer faces are pressed inward to form a pair of trunnions, of a pair of stems having their inner ends pivoted to said trunnions, a pair of cooperating wings secured to the outer ends of said stems, and a sleeve mounted on said shank and operative on said stems for opening and closing the wings.

In testimony whereof we affix our signatures in presence of two witnesses.

JOHN D. WALL.
OTTO ANKLAM.

Witnesses:
BERNICE G. BAUMANN,
HARRY D. KILGORE.